Patented Nov. 26, 1929

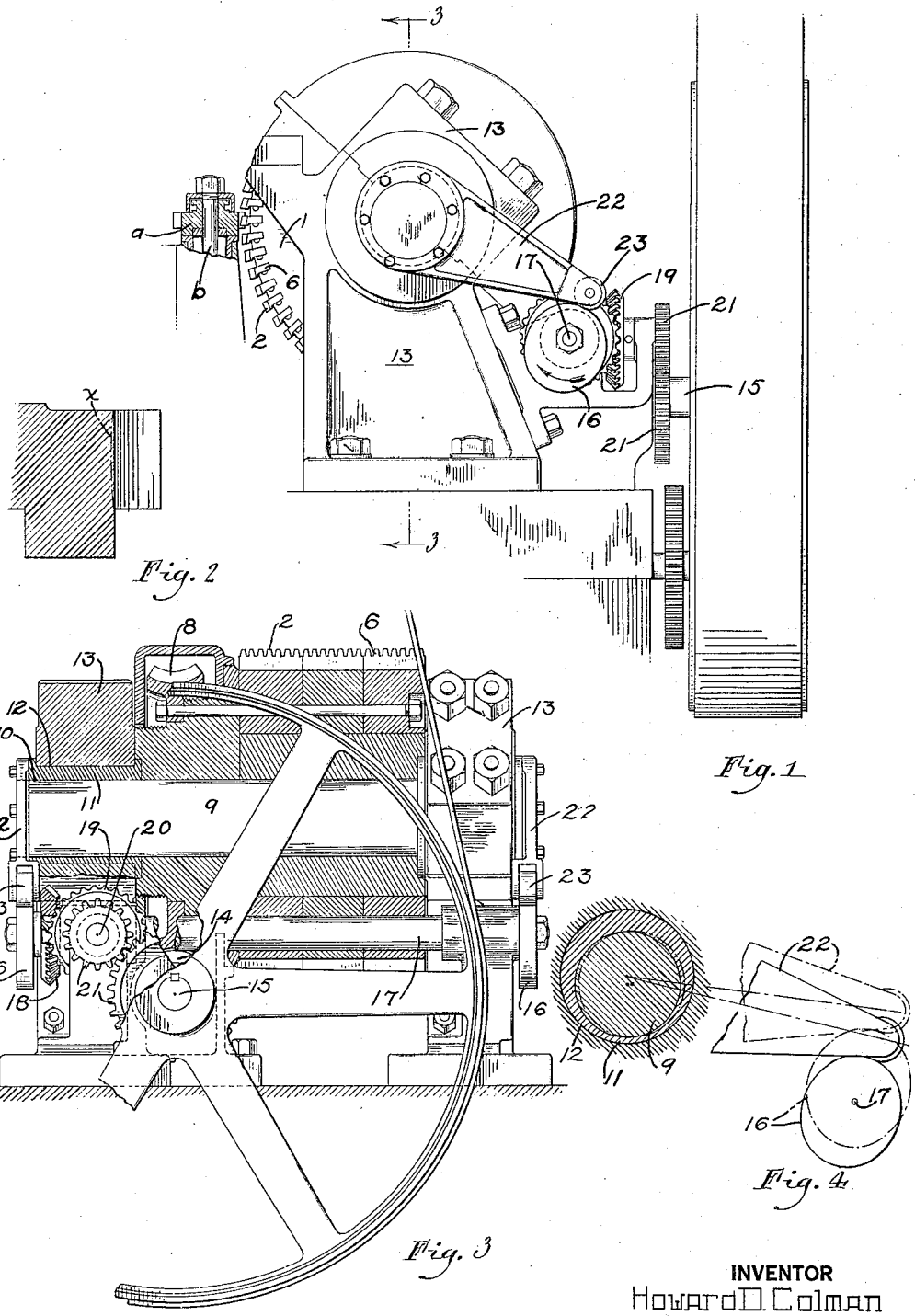

1,737,217

UNITED STATES PATENT OFFICE

HOWARD D. COLMAN, OF ROCKFORD, ILLINOIS, ASSIGNOR TO BARBER-COLMAN COMPANY, OF ROCKFORD, ILLINOIS, A CORPORATION OF ILLINOIS

GEAR-CUTTING MACHINE

Application filed April 24, 1925, Serial No. 25,496. Renewed April 17, 1929.

In application Serial No. 730,839 filed August 8, 1924 (now Patent No. 1,712,256, dated May 7, 1929), I have disclosed a gear-cutting machine comprising a milling cutter of relatively large diameter having upon its periphery a plurality of annular series of cutter teeth of rack-tooth form, the cutter having at least as many peripheral series of cutter teeth as there are tooth spaces in the gear wheel to be cut. The machine also comprises means for rolling a gear blank across the periphery of the cutter, the latter in its rotation serving to generate gear teeth upon the blank. Inasmuch as the cutter teeth travel in the arc of a circle while in engagement with the gear blank, it will be evident that the sides of the teeth and the bottoms of the tooth spaces will be somewhat concave, but in the machine shown in said application the ratio of the thickness of the gear blank to the radius of the cutter is so great that the teeth generated approximate so closely to the proper form that but little stock remains to be removed in the finishing operation.

The object of the present invention is to improve the machine shown in the above-mentioned application so as to eliminate the concaving above referred to and to render practicable the use of a cutter of smaller diameter and hence less costly.

In the accompanying drawings,

Figure 1 is a fragmental elevation of a gear-cutting machine embodying the features of my invention.

Fig. 2 is a fragmental sectional view of a gear wheel cut by means of the improved machine.

Fig. 3 is a view taken in the plane of line 3—3 of Fig. 1.

Fig. 4 is a diagrammatic view.

While the invention may be applicable to cutters of other types, I have herein shown a cutter 1 provided upon its periphery with a plurality of annular series of cutter teeth 2 (Fig. 3), said teeth being formed upon blades 6 (Fig. 1) secured within slots in the body of the cutter. As shown in Fig. 1 the teeth 2 are circumferentiallly spaced a distance which is at least equal to the thickness of the blank to be operated upon.

The cutter 1 and a worm wheel 8 are rigidly secured to a shaft 9. The opposite ends of the shaft 9 are rotatably mounted within bearing openings 10 eccentrically formed in bushings 11. The bushings 11 are mounted for oscillation in openings 12 provided in stationary bearing brackets 13 forming part of the machine framework.

The cutter 1 is rotated by means of a worm 14 (Fig. 3) mounted upon a shaft 15 which is supported in bearings in the machine frame, said worm meshing with the worm wheel 8.

Means is provided for rolling a gear blank $a$ across the periphery of the cutter, which means may be like that fully disclosed in the before-mentioned application Serial No. 730,839, or of any preferred construction. As the blank $a$ mounted on the arbor $b$ is rolled past the cutter the latter generates gear teeth upon the periphery of the blank. In order to eliminate the concaving hereinbefore alluded to and make each gear tooth of uniform cross-section from end to end, I provide means for reciprocating the cutter 1 toward and away from the gear blank, the reciprocation being so timed and of such a character as to cause each cutter tooth to travel in a path which is parallel to the axis of the blank during the time the cutter tooth is passing through the blank. The means herein shown for thus reciprocating the cutter comprises two cams 16 fixed upon opposite ends of a shaft 17 extending parallel with the cutter shaft 9 and rotatably mounted in suitable bearings in the machine framework. The shaft 17 is rotated by means of a bevel gear 18 (Fig. 3) fixed upon said shaft and meshing with a similar gear 19 which is fixed upon a shaft 20 mounted in bearings so as to extend parallel with the shaft 15. The shaft 20 is driven from the shaft 15 through intermeshing gears 21. Fixed to the outer ends of the bushings 11 are arms 22 carrying rollers 23 that bear upon the periphery of the cams 16.

Referring now to the diagram forming Fig. 4: It will be apparent that as the cams 16 revolve, the arms 22 will be swung up and down, thus oscillating the eccentric bushings 11 so as to shift the shaft 9 bodily toward and away from the gear blank a, the movement of translation of the shaft 9 being perpendicular to the axis of the gear blank, and the reciprocation being so timed that each cutter tooth travels in a straight line while passing through the blank. Consequently the gear teeth are given the same cross-sectional form from end to end. This is clearly shown in Fig. 2, where the dotted line x indicates the path which the cutter teeth would take if the cutter 1 revolved upon a stationary axis.

The worm wheel 8 is, of course, reciprocated with the cutter 1 and thus rolls back and forth along the worm 14. By reason of such movement along the worm, the cutter 1 when moved in one direction has its rotation accelerated and when moved in the opposite direction is retarded in its rotation. The cams 16 are so shaped as to compensate for such alternate acceleration and retardation.

Inasmuch as the cutter blades 6 are relatively expensive, it is desirable to reduce the number thereof as much as practicable. A substantial reduction over that shown in application Serial No. 730,839 may be effected by reducing the diameter of the cutter 1 as much as possible without employing an excessive amplitude of oscillation.

It will be understood that the construction herein shown may be modified in various ways without departing from the spirit and scope of the invention set forth in the appended claims.

I claim as my invention:

1. A gear generating machine having, in combination, a rotary cutter, means for supporting a blank in position to be cut by the cutter, a worm wheel rigidly connected to the cutter, a worm meshing with the worm wheel, and means including a cam for reciprocating the cutter perpendicularly to the axis of the blank, said cam being shaped to compensate for acceleration and retardation of the cutter due to rolling of the worm wheel along the worm.

2. A gear generating machine having, in combination, a rotary cutter, means for supporting a blank in position to be cut by the cutter, an eccentric bushing for supporting said cutter, an arm attached to said bushing, a cam for oscillating said arm, and gearing for rotating said cam and the cutter in timed relation to each other, said cam causing reciprocation of the cutter perpendicularly to the axis of the blank.

3. A gear generating machine having, in combination, a rotary cutter, means for supporting a blank in position to be cut by the cutter, the spacing of the cutter teeth being at least equal to the thickness of the blank, and mechanism for rotating and reciprocating the cutter, the reciprocation of the cutter being perpendicular to the axis of the blank and so timed with relation to the peripheral speed of the cutter that each cutter tooth travels in a path parallel to the axis of the blank while the tooth is passing through the blank.

4. A gear generating machine having, in combination, a rotary cutter, means for supporting a blank in position to be cut by the cutter, and means for causing relative reciprocation between the cutter and the blank perpendicularly to the axis of the blank in such timed relation to the peripheral speed of the cutter that each cutter tooth travels in a path parallel to the axis of the blank while the tooth is passing through the blank.

5. A machine for forming or operating upon gear teeth having, in combination, a rotary metal-removing wheel having upon its periphery active surfaces of rack-tooth shape in cross-section, the peripheral width of said wheel being at least equal to the circumference of the pitch circle of the gear or blank to be operated upon, means for supporting a gear or blank in position for action thereon by said wheel, and means for reciprocating said wheel relatively to the gear or blank to carry said active surfaces through a straight path while in engagement with the gear or blank.

In testimony whereof, I have hereunto affixed my signature.

HOWARD D. COLMAN.